(12) United States Patent
Gumprecht et al.

(10) Patent No.: US 8,505,968 B2
(45) Date of Patent: Aug. 13, 2013

(54) VEHICLE SEAT HAVING AN AIRBAG MODULE

(75) Inventors: Michael Gumprecht, Nassenfels (DE); Thomas Frank, Neuberg/Donau (DE)

(73) Assignee: Faurecia Autositze GmbH (DE)

( * ) Notice: Subject to any disclaimer, the term of this patent is extended or adjusted under 35 U.S.C. 154(b) by 0 days.

(21) Appl. No.: 13/377,812

(22) PCT Filed: Jun. 2, 2010

(86) PCT No.: PCT/DE2010/000621
§ 371 (c)(1),
(2), (4) Date: Feb. 2, 2012

(87) PCT Pub. No.: WO2010/142269
PCT Pub. Date: Dec. 16, 2010

(65) Prior Publication Data
US 2012/0139218 A1   Jun. 7, 2012

(30) Foreign Application Priority Data
Jun. 12, 2009 (DE) .......................... 10 2009 024 687

(51) Int. Cl.
*B60R 21/207* (2006.01)

(52) U.S. Cl.
USPC ...................................................... 280/730.2

(58) Field of Classification Search
USPC ..... 280/728.2, 730.2, 742, 743.2; 297/216.1, 297/216.13
See application file for complete search history.

(56) References Cited

U.S. PATENT DOCUMENTS

| 5,927,749 | A | * | 7/1999 | Homier et al. | 280/730.2 |
| 5,938,232 | A | * | 8/1999 | Kalandek et al. | 280/730.2 |
| 5,967,603 | A | * | 10/1999 | Genders et al. | 297/216.13 |
| 6,045,151 | A | * | 4/2000 | Wu | 280/728.3 |
| 6,095,602 | A | * | 8/2000 | Umezawa et al. | 297/216.1 |

FOREIGN PATENT DOCUMENTS

| DE | 19725559 A1 | * | 12/1998 |
| DE | 102006059303 | | 6/2008 |
| DE | 102007011823 | * | 9/2008 |

\* cited by examiner

*Primary Examiner* — Ruth Ilan
*Assistant Examiner* — Robert A Coker
(74) *Attorney, Agent, or Firm* — Robert W. Becker; Becker & Stachniak, P.C.

(57) ABSTRACT

A vehicle seat having an airbag module with an inflatable airbag cushion; a single or multi-part cover configured to cover the airbag module and an upholstered member, wherein an opening line for the airbag cushion is provided in the cover; and a reinforcing insert disposed between the cover and the airbag module for orientation of the airbag cushion when the latter inflates. In a non-triggered state of the airbag module, the reinforcing insert is folded into a multi-layer folded region that extends substantially orthogonally relative to the opening line. Upon an opening of the airbag cushion at the opening line, vertical force components can be formed in the region of the multi-layer folded region.

17 Claims, 4 Drawing Sheets

VEHICLE SEAT HAVING AN AIRBAG MODULE

The instant application should be granted the priority dates of 12 Jun. 2009, the filing date of the corresponding German patent application 10 2009 024 687.8, as well as Jun. 2, 2010, the filing date of the International patent application PCT/DE2010/000621.

BACKGROUND OF THE INVENTION

The present invention relates to a vehicle seat, in particular for a motor vehicle, pursuant to the introductory portion of claim 1.

Accommodated in the vehicle seat, in particular in its backrest, is an airbag module that is provided with an airbag cushion and in general a charge or gas generator for the airbag cushion. The airbag module can in particular be mounted on a frame component or structural part, e.g. on a side member of the backrest. Upon ignition, the airbag cushion unfolds and opens due to the charge of the airbag module, whereby its opening direction toward the front or toward the front and toward the side is established. For the establishment of this opening direction, an opening line is formed in the cover, in particular in the form of a tear seam by stitching together two cover parts or also by a deliberate material weakening, e.g. by means of a perforation of the cover. The airbag cushion thus unfolds toward the front through the foam body of the side arm rest, and opens the opening line of the cover.

DE 197 25 559 A1 shows a side airbag module where the gas bag is formed of an inner and outer gas bag plate, whereby the outer gas bag plate is longer and ahead of the stitching is folded with the inner gas bag plate. Alternatively, other embodiments of airbag cushions are possible in order to establish a suitable direction of expansion.

To establish the direction of expansion of the unfolded airbag cushion in a defined manner, it is further known to dispose a reinforcing field or insert between the cover and the airbag module. DE 10 2007 011 823 A1 describes such a configuration, with the reinforcing insert being formed as a spinnacker-shaped reinforcing field that establishes a direction of opening of the unfolding airbag cushion toward the front toward the tear seam.

It is also known to embody the reinforcing insert as a pocket that accommodates the airbag module and that opens toward the front upon ignition of the airbag cushion.

The reinforcing insert is in general secured on the cover in securement seams, and thus effects a direct introduction of force into the opening line of the cover, as a result of which the tearing-apart action is enhanced. Thus, due to the reinforcing insert the direction of unfolding of the airbag cushion is established, and furthermore the tearing-apart process of the opening line is enhanced.

DE 203 20 012 U1 describes the encasement of an airbag module in a foam environment of a motor vehicle seat construction, with a textile loop being placed about the airbag module and having a first and second portion, each with an outer side and inner side, whereby the portions are interconnected by a common tear seam. The textile loop is guided by the airbag module below the cover to the tear seam of the cover, and is stitched thereto.

SUMMARY OF THE INVENTION

It is an object of the present invention to provide a vehicle seat that with relatively little expenditure ensures the unfolding process of the airbag cushion into the desired direction of unfolding, and reliably enhances the tearing-apart of the opening line.

This object is realized by a vehicle seat comprising an airbag module having an inflatable airbag cushion; a single or multi-part cover configured to cover the airbag module and an upholstered member, wherein an opening line for the airbag cushion is provided in the cover; and a reinforcing insert disposed between the cover and the airbag module for orientation of the airbag cushion when the latter inflates, wherein in a non-triggered state of the airbag module, the reinforcing insert is folded into a multi-layer folded region that extends substantially orthogonally relative to the opening line, and wherein upon an opening of the airbag cushion at the opening line, the region of the multi-layer folded region is adapted to be acted upon by vertical force components.

Thus, pursuant to the present invention the reinforcing insert is folded, so that a multi-layer folded region is formed in it. The folded region can, in particular, be established or defined by at least two fold edges or fold lines, for example an upper and lower fold edge, between which a central folded region is established, so that in this region three layers are formed in the reinforcing insert. In principle, however, pursuant to the present invention also possible are embodiments having more than three layers and complementary fold edges.

The folded reinforcing insert can in particular be provided with a side airbag module of a backrest of a vehicle seat. Furthermore possible is also insertion in a seat cushion.

When used in a backrest, the opening line advantageously extends vertically, whereby then the multi-layer folded region advantageously extends substantially horizontally, i.e. in particular from the airbag module toward the front to the opening line formed at the front end. By the direction or extension direction of the fold or the folded multi-layer region is inventively to be understood the orientation or disposition of the fold edges or fold lines. In this connection, the fold edges can extend parallel to one another. Alternatively, however, also possible is a configuration where the fold edges diverge toward the front toward the opening line, so that that thickness of the multi-layer folded region formed between these fold edges widens somewhat toward the front.

The concept of the invention is, by means of the folding of the reinforcing insert, to achieve an introduction of force not only in the horizontal direction, i.e. orthogonal relative to the opening line, but also in the vertical direction or along the tear seam. As the airbag cushion opens it initially produces a lateral or horizontal introduction of force onto the vertical opening line. By means of the unfolding of the inventive additional folded region, complementarily an additional force is introduced into the opening line in the reinforcing insert due to the igniting airbag in the region of this fold. Thus, the opening process of the tear seam is reinforced in the region of the fold, so that the tearing-apart process is facilitated. In particular, pursuant to the present invention, the tearing-apart process of the opening line can also be better defined, since it starts in the multi-layer folded region and from there advantageously migrates upwardly and downwardly.

Pursuant to the present invention, it may also be possible to somewhat reduce the charge or the strength of the gas generator.

Pursuant to an inventive further development, the upper and lower fold edges can extend parallel, and the central fold layer can have an essentially constant width.

Alternatively, the upper fold edge and the lower fold edge can diverge relative to the opening line, and the central fold layer can widen relative to the opening line.

Pursuant to one inventive further development, the securement seam extends essentially orthogonally relative to the fold edges of the multi-layer folded region.

Pursuant to an inventive further development, the reinforcing insert can be embodied as a pocket that surrounds the airbag module, with the two ends of the pocket being connected with the cover in one or two securement seams. In so doing, the pocket can in particular be stitched with the opening line.

Pursuant to one inventive further development, in the vicinity of the securement seam the multi-layer folded region can be provided with a recessed area, and at least one fold layer of the multi-layer folded region, in particular a central fold layer, need not be stitched to the securement seam.

In the following, the invention will be explained by way of several specific embodiments with the aid of the accompanying drawings, in which:

DESCRIPTION OF SPECIFIC EMBODIMENTS

Figure 1:
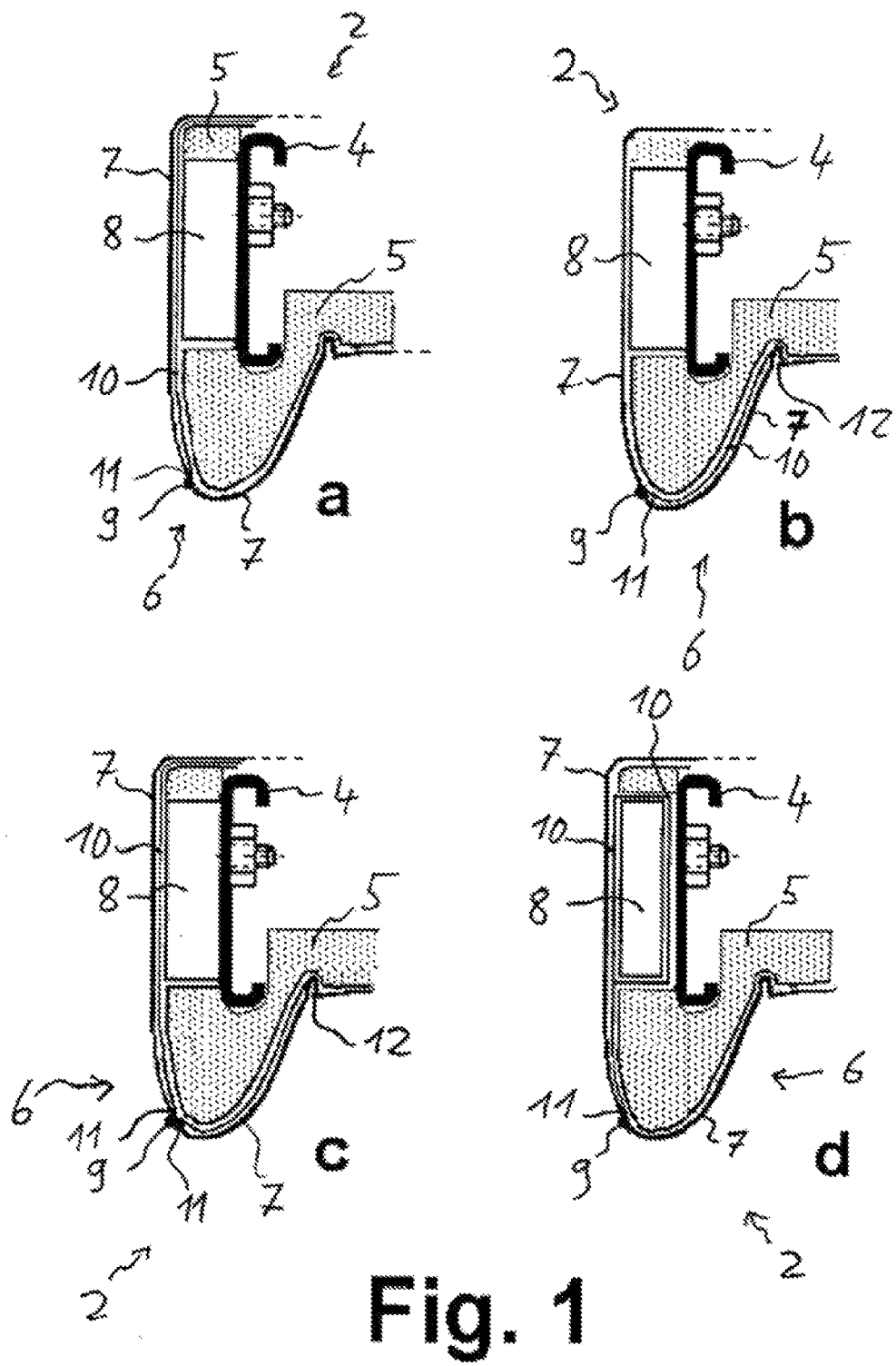
FIGS. 1a-d are horizontal sections taken along the line A-A of FIG. 2 through the right portion of a backrest of an inventive vehicle seat showing various arrangements of the inventive reinforcing insert.

The backrest 2, with the headrest 3, of a vehicle seat 1 is shown in the figures. Pursuant to the cross-sectional illustrations of FIGS. 1a-b, the right portion of the backrest 2 is provided with a right side member 4 as a metal carrier having a C- or U-shaped cross-section, an upholstered member 5 of foamed material, by means of which in particular also a protruding side wraparound 6 is formed, and a cover 7 that extends about the upholstered member 5. The cover 5 can be in one part, two parts, or in several parts. Secured, e.g. threadedly connected, to the side member 4 is an airbag module 8, which is known per se and in general comprises a housing, an airbag pillow or cushion 20, and an electrically ignitable gas generator or charge. Formed in the cover 7 at the front end of the side wraparound 6 is an opening line 9 for the unfolding or deploying airbag cushion 20, with the opening line being formed, for example, by stitching together two cover parts, or also by a material weakening, for example by means of a perforation of a continuous cover 7. The opening line 9 extends vertically in the cover 7.

Provided below the cover 7, i.e. between the cover 7 and the upholstered member 5 and/or the airbag module 8, is a reinforcing insert 10, which in the four embodiments of FIGS. 1a-d has different sizes and positions. The reinforcing insert 10 is secured in a securement seam 11 on the cover 7, with the securement seam being formed in the region of the opening line 9. If the opening line 9 is configured as a tear seam, the securement seam 11 can in principle also be combined with, or integrated in, the tear seam. Thus, the securement seam 11 can be stitched together with the tear seam that forms the opening line 9. Furthermore, the securement seam 11 can extend directly next to and parallel to the opening line 9, thus enabling a direct introduction of force.

Pursuant to the embodiment of FIG. 1a, the reinforcing insert 10 extends from the back side of the backrest 2, over its side surface, and toward the front up to the opening line 9. The reinforcing insert 10 thus covers the side surface of the airbag module 8.

Pursuant to the embodiment of FIG. 1b, the reinforcing insert 10 extends from the opening line 9 on the front side of the backrest 2 toward the middle, for example up to a tightening or tensioning groove 12 for receiving a tensioning wire for tensioning of the cover 7, or even still further toward the middle.

Pursuant to the embodiment of FIG. 1c, the reinforcing insert 10 extends over the entire side region of the backrest 2, i.e. in conformity with the two extensions of FIGS. 1a and 1b, so that the entire side wraparound 6, including the airbag module 8, is spanned by the reinforcing insert.

Pursuant to the embodiment of FIG. 1d, the reinforcing insert 10 forms a pocket that extends about the airbag module 8 and extends further along the outside of the backrest 2 toward the front up to the opening line 9.

Pursuant to the present invention, the reinforcing insert 10 is folded, i.e. is configured with at least one fold or a multi-layer folded region 14, which advantageously extends horizontally below the cover 7 up to the securement seam 11.

Figure 2:
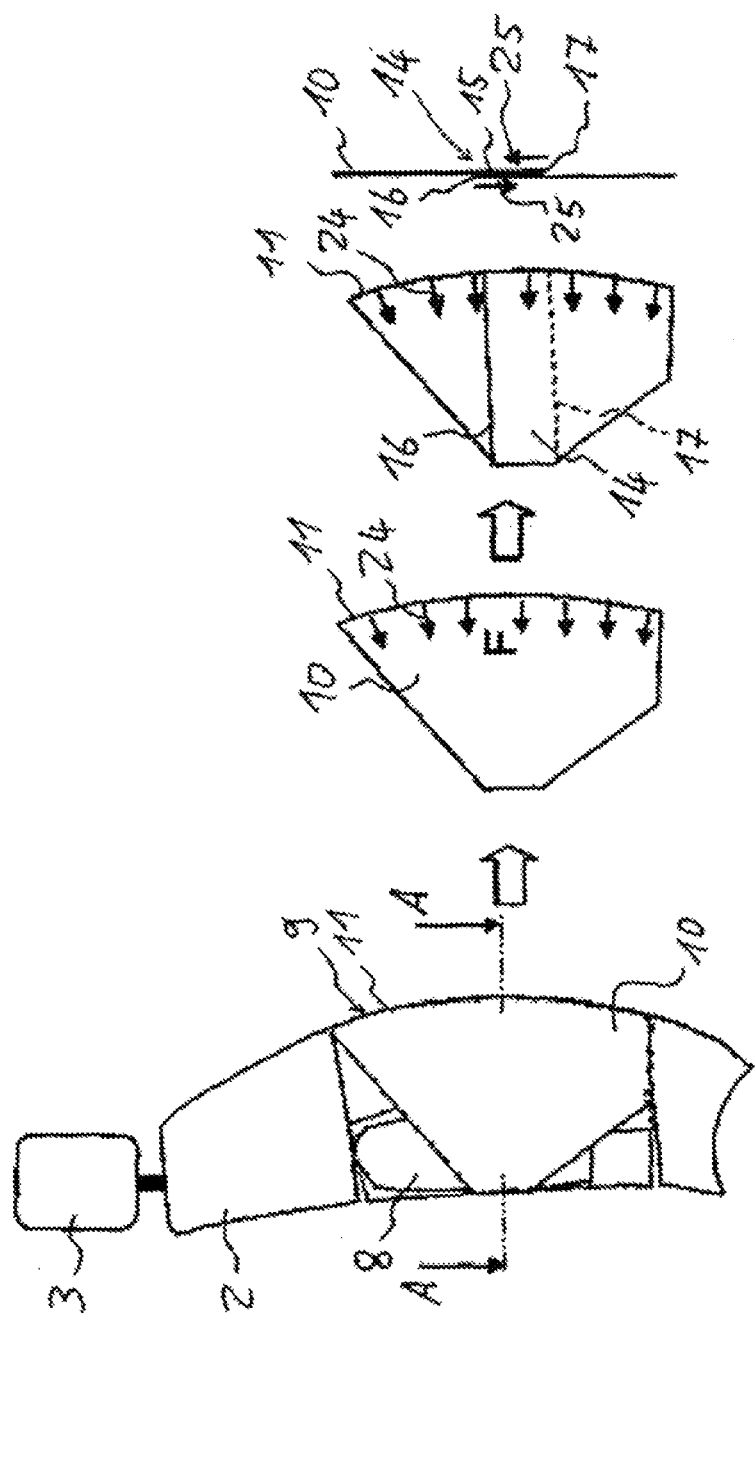
FIG. 2 is a vertical section through the backrest of FIG. 1 and shows the force introduction into the tear seam upon inflation of the airbag cushion.
Figure 3:
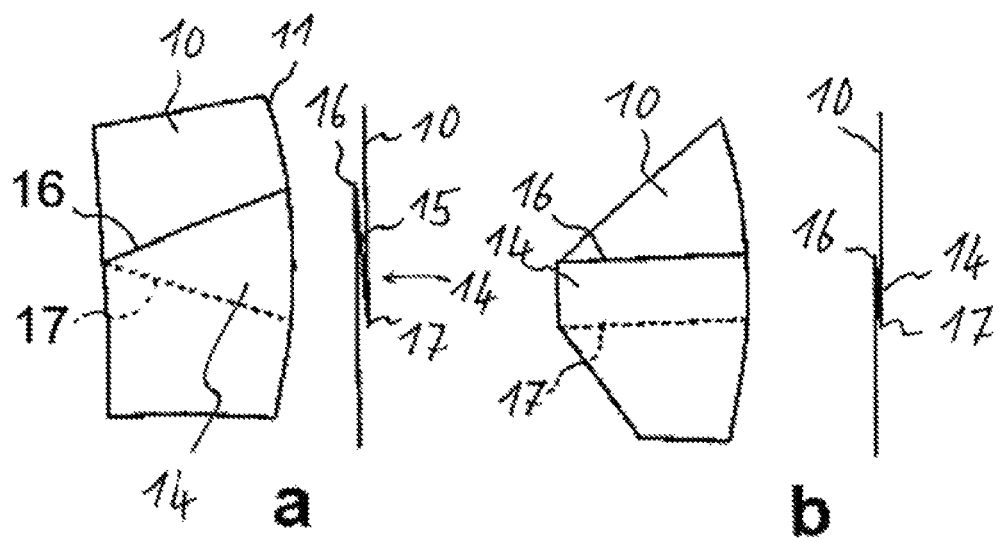
FIGS. 3a, b show different folds of the reinforcing insert, in each case in a side view and a front view.
Figure 4:
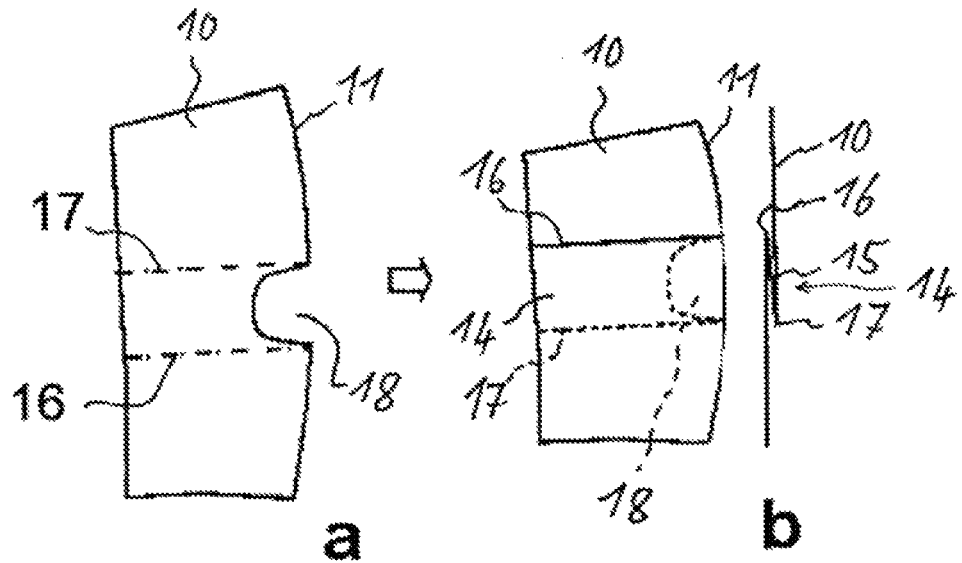
FIGS. 4a, b show the reinforcing insert pursuant to a further embodiment in unfolded and folded illustrations.
Figure 5:
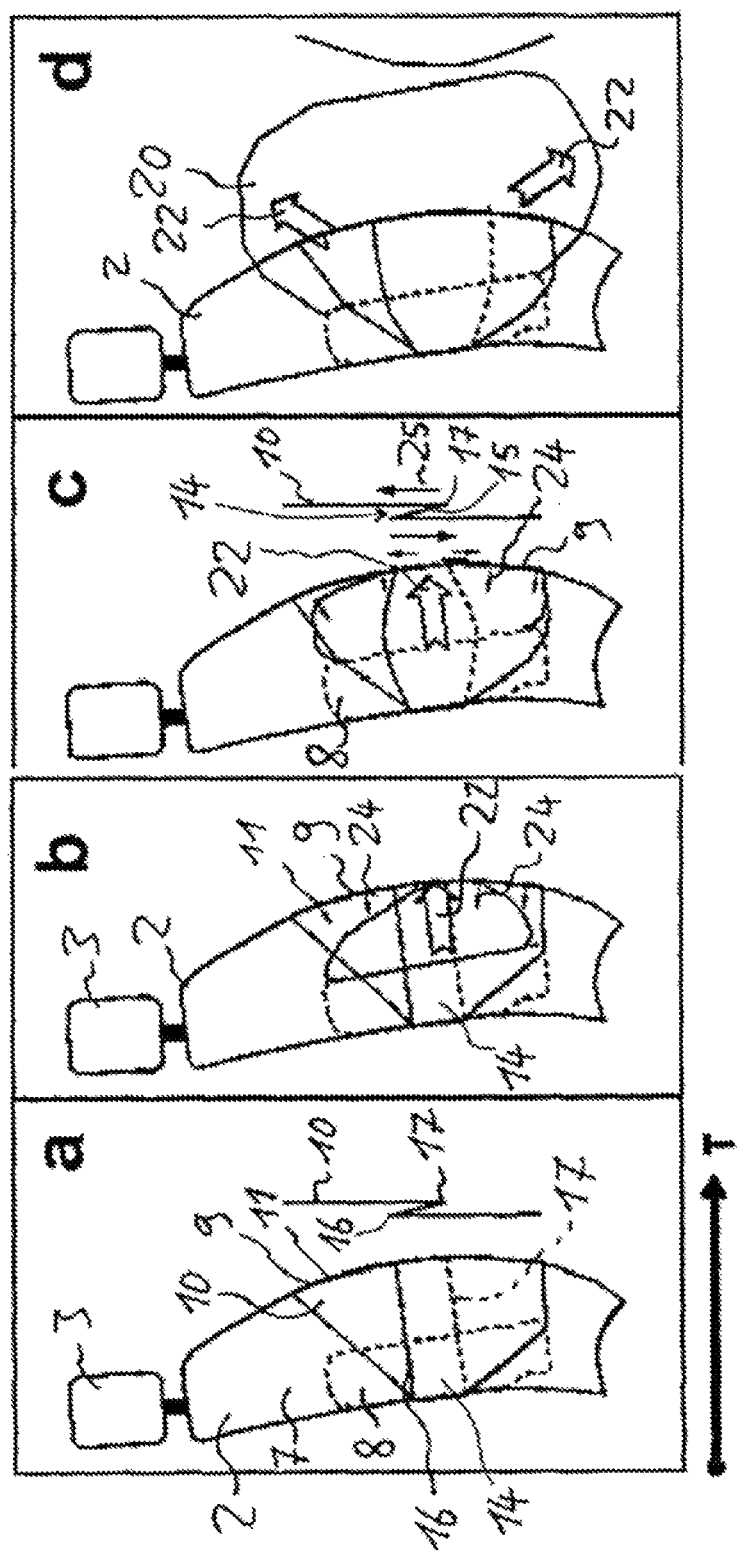
FIGS. 5a-d show the chronological progression of the inflation process of the airbag cushion and pulling apart of the tear seam.

The multi-layer folded region 14 can, in particular, be formed by an upper fold edge 16 and a lower fold edge 17 that is covered in FIGS. 2 to 4 and is thus shown by a dashed line. Between these fold edges 16, 17, the reinforcing insert 10 thus has a multi-layer configuration, whereby advantageously at least one central fold layer 15 is formed between the fold edges 16 and 17 and toward both sides is covered by the upper or lower layer of the reinforcing insert 10 respectively. Pursuant to FIGS. 2, 3b as well as 4a, b, the fold edges 16, 17 extend parallel and horizontally. Pursuant to FIG. 3a, the fold edges 16, 17 can also extend at an incline, i.e. somewhat inclined relative to the vertical direction, in particular, pursuant to FIG. 3a, with a widening of the multi-layer folded region 14 toward the front, so that the fold edges 16, 17 diverge toward the front. FIGS. 3a, b each show the front views, so that pursuant to FIG. 3a the multi-layer folded region 14 is the largest in the forward or front region of the reinforcing insert 10. As a consequence of the folding configuration of FIG. 3a, the reinforcing insert 10 is more trapezoidal in the unfolded state, and in the folded state approaches or comes closer to a square or rectangular shape.

The unfolded reinforcing insert 10 is shown in FIG. 4a, whereby here a recessed area 18 is formed in its central, front region, so that in the folded state of FIG. 4b, the multi-layer folded region 14, at its front end, does not have three layers, but rather has a two-layer or even a single-layer configuration, and at the securement seam 11 is stitched with only one layer or two layers. With the further embodiments of FIGS. 2, 3, 4 and 5, in principle also all of the layers of the fold or folded region 14 can be stitched with the opening line 9.

When the airbag module 8 is ignited or triggered, its airbag cushion 20 unfolds pursuant to the chronological sequence shown in FIGS. 5a to 5d. In FIG. 5a, the airbag module 8 is initially not ignited. Pursuant to FIG. 5b, the airbag module 8, or its housing, opens upon ignition, so that the airbag cushion 20 is inflated by the charge, and its direction of opening is established by the reinforcing insert 10, which is sufficiently resistant to tearing to withstand the pressure of the unfolding airbag cushion 20. Thus, the airbag cushion 20 opens toward the front in the direction of opening 22 illustrated by the large arrows, so that a tensioning or transverse force 24, shown as small arrows, is exerted upon the cover 7 in the region of the opening line 9; pursuant to FIG. 5b, this tensioning or transverse force 24 acts in the horizontal direction, i.e. acts on the opening line 9 toward the left and the right, in order to pull the covering 7 laterally apart.

Pursuant to the present invention, in addition to this transverse force or forces 24, vertical force components 25 are furthermore exerted upon the cover 7 in the region of its opening line 9 by the fold, whereby the vertical force components 25 are also shown by small arrows. When the airbag cushion 20 opens, the fold or folded region 14 is unfolded, so that the vertical force components 25 act upwardly and downwardly upon the layers of the multi-layer folded region 14, and additionally act on the securement seam 11, and thus on the opening line 9, which coincides with the securement seam 11, or is directly adjacent to it.

The inventively vertical force components 25 enhance the tearing-apart of the opening line. In particular, the starting region of the tearing-apart process can hereby be established more precisely, namely to the region where the multi-layer folded region 14 is connected.

The airbag module 8 and the reinforcing insert 10 together with the folded region 14 can, in principle, also be provided in a seat cushion of the vehicle seat 1.

The specification incorporates by reference the disclosure of German 10 2009 024 687.8 filed Jun. 12, 2009, as well as International application PCT/DE2010/000621 filed Jun. 2, 2010.

The present invention is, of course, in no way restricted to the specific disclosure of the specification and drawings, but also encompasses any modifications within the scope of the appended claims.

The invention claimed is:

1. A vehicle seat having an upholstered member and further comprising:
   an airbag module having an inflatable airbag cushion;
   a single or multi-part cover configured to cover said airbag module and the upholstered member, wherein an opening line for said airbag cushion is provided in said cover; and
   a reinforcing insert disposed between said cover and said airbag module for orientation of said airbag cushion when said airbag cushion inflates, wherein in a non-triggered state of said airbag module, said reinforcing insert is folded in a multi-layer folded region that extends substantially orthogonally relative to said opening line, and wherein upon an opening of said airbag cushion at said opening line, the region of said multi-layer folded region is adapted to be acted upon by vertical force components.

2. A vehicle seat according to claim 1, wherein said multi-layer folded region is defined by at least two fold edges, and wherein a central fold layer is formed between said fold edges.

3. A vehicle seat according to claim 2, wherein said opening line extends substantially vertically, and said multi-layer folded region extends substantially horizontally, further wherein said multi-layer folded region has an upper fold edge and a lower fold edge, and wherein said central fold layer is formed between said upper fold edge and said lower fold edge.

4. A vehicle seat according to claim 3, wherein said upper and lower fold edges extend parallel, and said central fold layer has an essentially constant width.

5. A vehicle seat according to claim 3, wherein said upper fold edge and said lower fold edge diverge toward said opening line, and wherein said central fold layer widens in a direction toward said opening line.

6. A vehicle seat according to claim 3, wherein each of said upper and lower fold edges extends horizontally, or is inclined with horizontal components.

7. A vehicle seat according to claim 2, wherein said reinforcing insert is secured to said cover via at least one securement seam, and wherein said at least one securement seam is combined with said opening line or is formed adjacent to said opening line.

8. A vehicle seat according to claim 7, wherein said at least one securement seam extends substantially orthogonally relative to said fold edges of said multi-layer folded region.

9. A vehicle seat according to claim 7, wherein said opening line is embodied as a tear seam, and wherein said at least one securement seam is combined with said tear seam or is formed adjacent thereto.

10. A vehicle seat according to claim 7, wherein said multi-layer folded region is provided with a recessed area in the vicinity of said at least one securement seam, and wherein at least one fold layer of said multi-layer folded region is not stitched to said securement seam.

11. A vehicle seat according to claim 10, wherein said at least one fold layer of said multi-layer folded region is a central fold layer.

12. A vehicle seat according to claim 7, wherein said reinforcing insert is embodied as a pocket that surrounds said airbag module, and wherein opposite ends of said pocket are connected to said cover in one or two securement seams.

13. A vehicle seat according to claim 7, wherein said reinforcing insert has a single-layer configuration beyond said multi-layer folded region and is disposed directly below said cover.

14. A vehicle seat according to claim 1, wherein said vehicle seat is further provided with a backrest and a structural component, further wherein airbag module is disposed in the backrest of the vehicle seat and is secured to the structural component thereof, and wherein said opening line is disposed at a side portion or a lateral forward portion of the seat.

15. A vehicle seat according to claim 14, wherein said opening line is disposed at a side wraparound of the vehicle seat.

16. A vehicle seat according to claim 14, wherein at least one part of said reinforcing insert extends along a side surface of the backrest from said airbag module forwardly up to said opening line or a securement seam for said reinforcing insert.

17. A vehicle seat according to claim 14, wherein at least a part of said reinforcing insert extends from said opening line toward a center of the backrest.

* * * * *